United States Patent [19]

Carpenter et al.

[11] Patent Number: 5,162,271

[45] Date of Patent: Nov. 10, 1992

[54] METHOD OF FORMING A DUCTILE FIBER COATING FOR TOUGHENING NON-OXIDE CERAMIC MATRIX COMPOSITES

[75] Inventors: Harry W. Carpenter, Northridge; James W. Bohlen, Fountain Valley; Wayne S. Steffier, Huntington Beach, all of Calif.

[73] Assignee: Northrop Corporation, Hawthorne, Calif.

[21] Appl. No.: 669,133

[22] Filed: Mar. 13, 1991

[51] Int. Cl.$^5$ .............................................. C04B 35/76
[52] U.S. Cl. ................................. 501/95; 428/389; 428/384; 427/212; 427/215; 427/217
[58] Field of Search .................. 501/95; 428/389, 384; 427/212, 215, 217

[56] References Cited

U.S. PATENT DOCUMENTS

| 4,134,759 | 1/1979 | Yajima et al. | 423/435 |
| 4,831,707 | 5/1989 | Goddard et al. | 228/124 |
| 4,885,199 | 12/1989 | Corbin et al. | 428/113 |
| 4,909,910 | 3/1990 | Morin | 204/30 |
| 4,933,309 | 6/1990 | Luthra | 501/95 |

Primary Examiner—William R. Dixon, Jr.
Assistant Examiner—Sue Hollenbeck
Attorney, Agent, or Firm—Terry J. Anderson; Robert B. Block; Karl J. Hoch, Jr.

[57] ABSTRACT

A method of toughening a fiber/matrix ceramic composite consisting of non-oxide based ceramic fibers immersed in a ceramic matrix. The method includes, prior to immersing the fibers in the matrix, applying a metallo-organic solution of a noble metal to the fibers to form a coating of the solution on the fibers, evaporating the solvent from the solution and oxidizing the residual organic compounds whereby the coating becomes a pure noble metal and immersing the coated fibers in the matrix. The applying, evaporating, oxidizing and immersing steps are characterized by a limited raising of the temperature of the fibers. The coating is ductile so as to blunt advancing cracks in the matrix.

13 Claims, 1 Drawing Sheet

METHOD OF FORMING A DUCTILE FIBER COATING FOR TOUGHENING NON-OXIDE CERAMIC MATRIX COMPOSITES

BACKGROUND OF THE INVENTION

1. Technical Field

The invention is related to methods of forming ceramic matrix composites using fibers coated with a toughening layer that protects the fibers from advancing cracks in the ceramic matrix.

2. Background Art

Fiber reinforced ceramic matrix composites comprise a framework of ceramic fibers embedded in a ceramic matrix. The mechanical properties (e.g., toughness, strength and strain to failure) of such composites can be significantly improved by providing a ductile coating over the fibers that is stable and preferably resistant to oxidation and that defeats advancing cracks from propagating through the fibers in the composite. Fracture of the brittle fibers is defeated by the ductile coating because the ductile material blunts advancing cracks and absorbs strain energy. The resistance to fiber failure can be further improved by the ductile coating because it accommodates excessive strains caused by any mismatch in thermal expansion between the fiber and matrix, and because the relatively weak shear strength and the ductility of the coating allow the fiber to bridge the crack opening without prematurely failing the brittle fibers. Even further improvement can be achieved by providing an optimum interfacial shear strength between fiber and ductile coating, and/or between the ductile coating and matrix, such that the fibers pull out in the wake of the cracks. This pull-out will dissipate additional strain energy due to frictional sliding of the fiber through the matrix. These features enhance the toughness and strength of the composite because the unbroken fibers hold the composite together and bear the load in the wake of advancing cracks in the matrix. The history of development of this technique is described in U.S. Pat. No. 4,885,199 to Corbin et al.

For certain applications, the ceramic matrix composite must be stable at temperatures above 2200 degrees F. in an oxidizing environment. Well-known fiber coatings such as carbon and boron nitride are not stable under such conditions. Any material to be substituted for a fiber coating in place of the carbon or boron nitride must be both resistant to oxidation and must possess sufficient strength to transfer loads from the matrix to the fiber while having the necessary properties to protect the fibers from failure caused by advancing cracks in the matrix and to extend the bridging characteristics of the fibers in the wake of the crack. Furthermore, the coating must be easy to apply to yarns and to weaves of ceramic fibers during manufacturing. This approach is also useful in certain applications where the temperatures are intermediate, for example, 800 to 2000 degrees F. Moreover, in some applications, where the environment will not be oxidizing, the ductile metal could be any one of many candidates including refractory metals and alloys and transition metals and alloys, such as Ni, NiCr or FeCrAlY.

U.S. Pat. No. 3,869,335 to Siefert discloses metal-coated glass fibers in a glass matrix, where the metal layer acts as a diffusion barrier to protect the fibers from reacting with the glass matrix. Since there is a glass coating over the metal coating, Siefert is not directed to high or intermediate temperature ceramic composites. U.S. Pat. No. 3,943,090 to Enever discloses carbon fibers in synthetic plastic with an elastomer coating on the carbon fibers, and is not directed to high temperature ceramics with a ductile metal coating for the fibers.

The prior art as described in U.S. Pat. No. 4,885,199 referenced above typically relied upon the characteristics of the chemical bond between the fiber coating and the fiber or intrinsic properties of the coating such as cleavage to achieve desired characteristics, such as toughening. For applications in the high temperature oxidizing environments described above, the chemical bond between the coating and the fiber would have to provide all of the necessary features, including crack blunting, crack deflection, fiber de-bonding and pull-out as well as resistance to oxidation and high temperatures. The problem with this approach is that it is very difficult to select the best fiber coating material for a given ceramic fiber so as to optimize all of the foregoing features in the same chemical bond or to select a coating with intrinsic laminar shear failure at the right strength.

In the present invention, the desired mechanical features for promoting fiber toughness are realized by depositing a ductile or soft metal coating on the fibers prior to forming the ceramic matrix. Preferably, the coating is a ductile metal which is resistant to oxidation and is stable at intermediate to high temperatures. The ductile characteristic of the metal is the mechanical property that provides the features necessary for toughness. The chemical properties of the metal coating are selected to provide the requisite imperviousness to oxidation.

As one example, the ductile metal coating in one embodiment is a metal selected from the group of noble metals, such as platinum or iridium, formed in a coating or film covering the fibers in a thickness on the order of between 0.1 and 1 micron. Platinum is the most oxidation resistant of all metals, but it does react with silicon, requiring a diffusion barrier when coating ceramic fibers containing silicon. The coefficients of thermal expansion of platinum and iridium are high compared with silicon based ceramic fibers, but the thermal expansion will be accommodated by the high ductility and relatively low elastic modulus of platinum or iridium. The thermal expansion of platinum or iridium is more compatible with that of $Al_2O_3$-based ceramic fibers.

Coating a ceramic fiber which is to be immersed in a ceramic matrix with a coating consisting of a noble metal is disclosed in U.S. Pat. No. 4,933,309 and U.S. Pat. No. 4,921,822 both to Luthra. Luthra discloses that the noble metal is deposited by metal sputtering, chemical vapor deposition, electroplating, or electroless plating or any combination of these processes. The problem is that such processes are relatively difficult to perform rapidly on a large production scale while maintaining a uniform coating of the metal around all of the fibers in the fiber weave. Therefore, there is a need to provide a method for coating a ceramic fiber or a weave of such fibers with a noble metal film prior to incorporating the fiber or weave into a ceramic matrix which enables the coating process to be performed more reliably and uniformly and with greater ease and rapidity on a large production scale than has been possible heretofore.

A major problem that is not addressed by Luthra is how to form a noble metal coating on non-oxide ceramic fibers, such as silicon, carbide and silicon nitride. Luthra was concerned only with oxide-based ceramics, such as alumina, which is much more resistant to oxidation at high temperatures than the non-oxide ceramics. Accordingly, Luthra was free to use any coating process, including those performed at intermediate temperatures of around 2000 degrees F. (such as chemical vapor deposition). Therefore, the art does not address the problem of how to form a noble metal coating on a non-oxide ceramic fiber in a manner which takes into account the greater tendency of the non-oxide ceramic fiber to react with the noble metal at high temperatures (compared with oxide-based ceramic fibers). The noble metal deposition processes taught by Luthra do not take into account this tendency of non-oxide ceramic fibers.

Accordingly, it is an object of the invention to provide a method for coating ceramic fibers prior to their immersion or inclusion in a ceramic matrix with a noble metal film without having to perform sputtering, chemical vapor deposition, electroplating or electroless plating and with a rapidity and reliability superior to that achieved in such processes.

It is a related object of the invention to form a highly uniform noble metal coating on a non-oxide ceramic fiber without having to elevate the temperature of the fiber or otherwise radiate energy to the fiber, in a process which thus takes into account the greater tendency of the non-oxide ceramic fiber to react with the noble metal at high temperatures (compared with oxide-based ceramic fibers).

SUMMARY OF THE INVENTION

In the present invention, a method is provided for coating non-oxide ceramic fibers with a noble metal with greater rapidity, uniformity and greater facility to coat complex fiber architectures, larger sizes and complex shapes, without raising the fiber temperature and without performing any of the coating techniques taught by Luthra. The method includes dissolving the noble metal in an organic acid or the like to form a metallo-organic solution, immersing a tow of fibers in a continuous fashion or immersing the weave of ceramic fibers in the solution or infiltrating the weave with the solution so that all fiber surfaces are covered with the solution and finally allowing the solvent in the solution adhering to the fibers to evaporate away and organic compounds to oxidize, leaving only the noble metal covering the fibers. The fibers or the fiber weave are then combined with a ceramic matrix to form the ceramic fiber matrix composite.

The advantage of the invention is that the liquid aspect of the metallo-organic solution ensures a complete coverage of every fiber in the weave with a noble metal coating without requiring excessive elevation in temperature. Thus, for non-oxide based ceramic fibers, the tendency to react with the metal coating is virtually eliminated. In contrast, chemical vapor deposition techniques may require that the temperature of the fiber be highly elevated for durations on the order of one to ten hours and that the fiber be exposed to highly corrosive gases, for example. Thus, the invention solves the problems of how to deposit a noble metal coating on a non-oxide ceramic fiber without causing the fiber to react with the metal coating during the deposition process and how not to degrade the fiber by the deposition process. This approach has the advantage of easy application of the ductile metal coating to ceramic filaments prior to making the reinforcement preform or to complex woven architectures just prior to forming the matrix in ceramic matrix composites.

In another aspect of the invention, the fiber and/or the matrix is made of a non-oxide ceramic material such as a silicon-based ceramic material (e.g., silicon nitride) whose silicon component tends to react with platinum, while the fiber coating is platinum. In this embodiment, if the fiber is silicon nitride, for example, the invention includes coating the fiber with a diffusion barrier such as a thin layer or film of zirconia prior to the deposition of the platinum coating on the fiber. If the ceramic matrix is also silicon nitride, for example, the invention includes coating the noble metal coating on the fiber with a diffusion barrier, such as a thin layer or film of zirconia. Thus, for example, if both the fiber and the matrix are silicon-based ceramics, a zirconia diffusion barrier or film is deposited on the fibers before the platinum metal coating is formed and is deposited on the platinum-coated fibers after the platinum coating is formed, thereby sandwiching the platinum coating between zirconia diffusion barrier films.

BRIEF DESCRIPTION OF THE DRAWING

The invention is described below with reference to the accompanying drawing, which is a diagram of a composite ceramic fiber/matrix structure made in accordance with the invention.

DETAILED DESCRIPTION OF THE INVENTION

Figure 1:
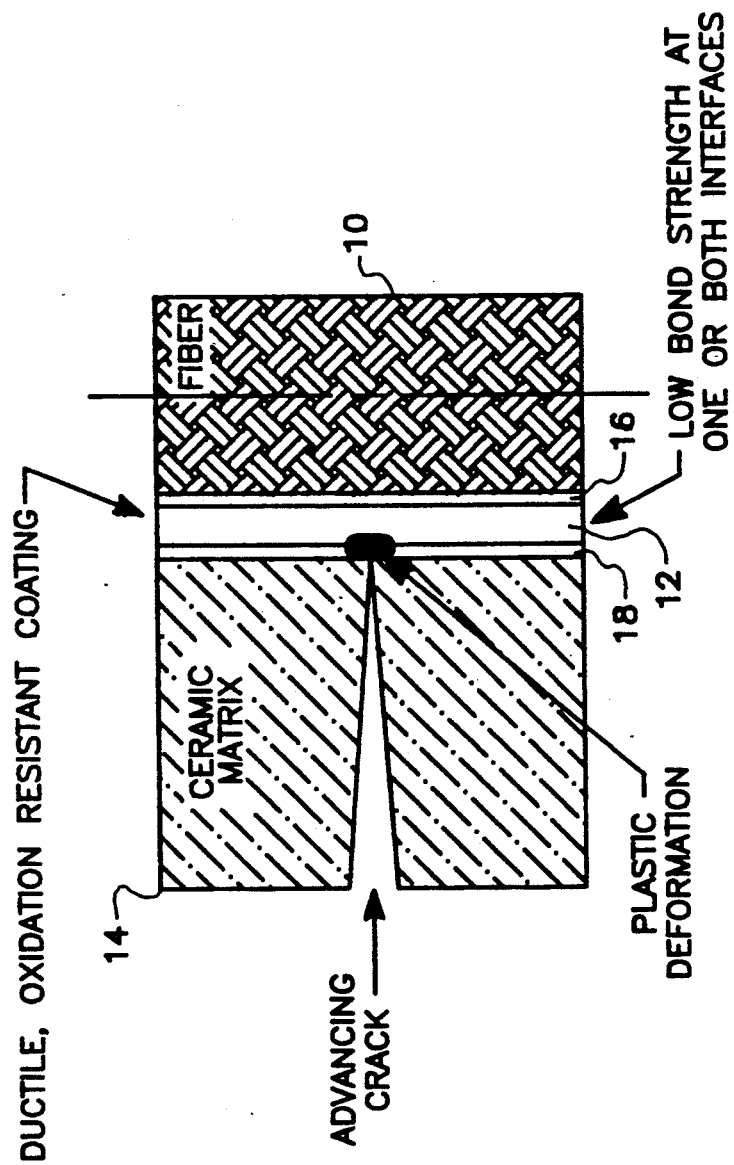

A noble metal is dissolved in an organic solution. Referring to the drawing, a non-oxide based ceramic fiber 10 (such as a silicon carbide or silicon nitride ceramic fiber) which may be part of a weave of such fibers is either immersed in the solution or else the solution is painted or poured on the fiber weave to form a metallo-organic solution coating 12 on the entire surface of every fiber in the weave including the fiber 10. Care is taken to slowly elevate the temperature of the fiber weave from 800 degrees F. to 1650 degrees F., thereby avoiding any reaction between the non-oxide ceramic fiber 10 and the noble metal in the coating 12. The solution film 12 and the fiber 10 are allowed to stand while the organic solvent in the metallo-organic solution coating 12 evaporates and the resinate oxidizes, so that the coating 12 becomes a coating of pure noble metal. After the coating 12 has stabilized as a pure noble metal, the weave including the coated fiber 10 and the noble metal coating 12 are filled with a ceramic matrix 14 using techniques well-known in the art, thus forming the structure illustrated in the drawing.

In the wake of an advancing crack in the ceramic matrix 14, the ductility of the noble metal coating 12 blunts the crack without transmitting it to the fiber 10 and while permitting the fiber 10 to debond from the coating 12 and therefore from the matrix 14.

In an alternative embodiment of the invention, a diffusion barrier 16, such as a thin film of zirconia, is coated over the surface of the fiber 10 using conventional techniques before the noble metal metallo-organic solution coating 12 is deposited on the fiber 10. This embodiment is particularly advantageous if the fiber 10 is a non-oxide silicon-based ceramic and if the metal in the coating 12 is platinum, for example. In a related alternative embodiment, if the ceramic matrix 14 is also a silicon-based non-oxide ceramic, then an outer diffusion barrier 18, such as a zirconia film, is deposited on the outer surface of the noble metal coating 12 using conventional techniques after the coating 12 has stabilized and before the fiber 10 and coating 12 are immersed or formed with the ceramic matrix 14. The zirconia diffusion barriers 16, 18 prevent the platinum in the fiber coating 12 from reacting with the silicon in the ceramic materials 10, 14.

The metal coating 12 has been disclosed as being selected from the group of noble metals. However, the only requirements are that the metal be sufficiently ductile to blunt cracks and that the metal be impervious to oxidation. Optionally the application process deposits a layer with optimum interfacial shear strength to promote fiber de-bonding and pull-out in the wake of an advancing crack.

The invention permits the deposition of a noble metal fiber coating at temperatures which prevent reaction with non-oxide ceramic fibers, in contrast to prior art techniques such as chemical vapor deposition which can take as long as one to ten hours at a high temperature. However, once fabrication of the complete ceramic fiber/matrix structure of the present invention is finished, its temperature need not be so restricted, and the structure can be subjected to higher temperatures.

While the invention has been described in detail with reference to preferred embodiments thereof, it is understood that variations and modifications thereof may be made without departing from the true spirit and scope of the invention.

What is claimed is:

1. A method of producing a composite of non-oxide ceramic fibers in a ceramic matrix including a noble metal coating surrounding each of said fibers, comprising:

forming a metallo-organic solution of a noble metal comprising said noble metal and an organic solvent;

applying said metallo-organic solution to said non-oxide ceramic fibers whereby a layer of said solution is deposited on surfaces of said fibers;

heating said layer to a temperature between approximately 800 degrees F. and approximately 1650 degrees F., whereby said solvent is evaporated from said layer, a resinate of said layer is oxidized from said layer, said layer becomes said coating on said fibers, said coating having a thickness between approximately 0.1 micron and approximately 1 micron, and reactions between said coating and said fibers are avoided; and combining said coated fibers with a ceramic matrix-forming material to form a ceramic fiber matrix composite.

2. The method of claim 1 wherein said non-oxide ceramic fibers comprise a ceramic selected from the group of ceramics which tend to react with noble metals at high temperatures said ceramics comprising silicon, nitrides and carbides.

3. The method of claim 1 wherein said coating is ductile, whereby cracks advancing in the ceramic matrix are blunted and whereby further said fiber is permitted to debond from said coating and from said ceramic matrix.

4. The method of claim 1 further comprising depositing a diffusion barrier between said fiber and said coating.

5. The method of claim 4 wherein said diffusion barrier comprises zirconia.

6. The method of claim 5 wherein said fiber comprises a non-oxide silicon-based ceramic and said fiber coating comprises platinum.

7. The method of claim 1 wherein said applying step comprises either immersing said fibers into said solution or painting said solution onto said fibers or pouring said solution onto said fibers.

8. A method of toughening a fiber matrix ceramic composite having non-oxide ceramic fibers which tend to react with noble metals at high temperatures immersed in a ceramic matrix, said method comprising:

prior to immersing said fibers in said matrix, applying a metallo-organic solution comprising a noble metal and an organic solvent to said fibers to form a layer of said solution on said fibers;

heating said layer to a temperature between approximately 800 degrees F. and approximately 1650 degrees F., whereby said solvent is evaporated from said layer, a resinate of said layer is oxidized from said layer, said layer becomes a noble metal coating on said fibers, said coating having a thickness between approximately 0.1 micron and approximately 1 micron, and reactions between said coating and said fibers are avoided; and combining said coated fibers with a ceramic matrix-forming material to form a ceramic fiber matrix composite.

9. The method of claim 8 wherein said coating is ductile.

10. The method of claim 9 further comprising depositing a diffusion barrier between said fiber and said coating.

11. The method of claim 10 wherein said diffusion barrier comprises zirconia.

12. The method of claim 11 wherein said fiber comprises a non-oxide silicon-based ceramic and said noble metal comprises platinum.

13. The method of claim 9 wherein said applying step comprises either immersing said fibers into said solution or painting said solution onto said fibers or pouring said solution onto said fibers.

* * * * *